United States Patent [19]

Riedmayr

[11] 3,944,980
[45] Mar. 16, 1976

[54] ELECTRONIC SEQUENCE CONTROL SYSTEM

[75] Inventor: Georg Riedmayr, Munich, Germany

[73] Assignee: Carl Hurth, Maschinen- und Zahnradfabrik, Munich, Germany

[22] Filed: Aug. 14, 1974

[21] Appl. No.: 497,332

[30] Foreign Application Priority Data
Aug. 30, 1973 Germany............................ 2343664

[52] U.S. Cl............ 340/147 P; 328/75; 235/92 ME; 235/132 E
[51] Int. Cl.² ................... H04Q 9/00; H03K 17/28
[58] Field of Search ................ 340/147 P, 147 MT; 235/92 ME, 151.11, 132 E, 92 ME; 328/72, 75, 130

[56] References Cited
UNITED STATES PATENTS

| | | | |
|---|---|---|---|
| 3,317,894 | 5/1967 | Jensen ............................ | 340/147 P |
| 3,541,512 | 11/1970 | Hilburger ....................... | 340/147 P |
| 3,622,990 | 11/1973 | Lerch et al. .................... | 340/147 P |
| 3,719,925 | 3/1973 | Vinch .............................. | 340/147 P |
| 3,840,752 | 10/1974 | Eshraghian ..................... | 340/147 P |

Primary Examiner—Donald J. Yusko
Attorney, Agent, or Firm—Woodhams, Blanchard and Flynn

[57] ABSTRACT

Electrical sequence control system. There is described an electrical sequence control system which is controlled according to a predetermined program by means of a switching circuit wherein the outputs of the binary counter are connected with $n$ bits to the data inputs of the decoder and the address inputs of a multiplexer, the output of the latter being applied to one input of an AND-gate and the second input of said AND-gate being connected to a rectangular wave generator. The output of the AND-gate is connected to the input of the binary counter and the connection of the output of the multiplexer with the input of the binary counter acts as a return when one of the input signals at the multiplexer corresponds with the address input.

7 Claims, 4 Drawing Figures

ELECTRONIC SEQUENCE CONTROL SYSTEM

FIELD OF THE INVENTION

The invention relates to an electronic sequence control system and particularly to such a system which is controlled by a switching circuit in accordance with a predetermined program.

BACKGROUND OF THE INVENTION

It is known to use a stepping mechanism for controlling sequences. However, such known devices have the disadvantage that the switching pulses are neutral, namely are not controlled by the sequence of operations itself. Furthermore in this connection, contactor and relay controls are known which are installed fixedly for a certain purpose. These controls are so to speak manufactured according to specifications and are accordingly inflexible.

The purpose of the electronic sequence control is to eliminate the neutral switching pulses. Instead the energizing of the circuit is accomplished in response to input signals which are determined by the sequence of operations.

The more narrow purpose of the invention is to produce as much as possible an uncomplicated and therefore inexpensive electronic sequence control which is highly flexible in use. It is to be sufficiently simple in structure that a man skilled in the art of electronics is not required to use the control but instead it can be satisfactorily handled by any reasonably competent workman. In particular for the tool machine construction it is important that the control also be understood by a machine mechanic.

SUMMARY OF THE INVENTION

The invention is based on the general principle that a binary counter is used which is combined with a multiplexer so that the duration of counting by which the method steps are controlled depends on certain signals.

In detail the basic purpose of the invention is attained by a circuit of the general type aforesaid in which the outputs of a binary counter 110 are connected with $n$ bits to the data inputs A, B, C, D of a decoder 111 and the address inputs A',B', C',D' of a multiplexer 112, whose output is applied to one input of an AND-gate 115, the second input of said AND-gate being connected to a pulse generator 114, while the output of the AND-gate is connected to the input of the binary counter 110, and that the connection of the output of the multiplexer with the input of the binary counter acts as a return when one of the input informations El to Ex at the multiplexer 112 corresponds with the address inputs.

A sequence control according to the invention has the following advantages compared with controls which use as their basic components transistor-relay combinations (German Auslegeschrift No. 1 218 507) and also as compared with a socalled control for shifting the program steps. There is for each step a circuit component required which is relatively complex and hence relatively expensive. The invention, however, operates with a binary counter which has the consequence that for example the increase of a binary counter from 4 bits to 5 bits results in an increase of the stepping switch from 15 to 31 steps. Thus the invention advantageously provides for simple and inexpensive increase in capacity as already exemplarily pointed out above.

In order to assure that the sequence control continues to count efficiently without interference from one control impulse to another, the invention is further developed by providing that the pulse generator be an astable multivibrator (rectangular wave generating device). This characteristic is a particularly important development of the invention.

A particular advantage of the invention is that the control device can be combined of commercial integrated components, in particular of components of medium integration (Medium Scale Integration, MSI). These components are already known.

With respect to this:

The binary counter is advantageously a synchronous counter, for example a counter which is two-flank controlled by a pulse generator. For reasons of reliability, it is advantageous that in an extensive control all control operations are derived from a single pulse signal. Also binary counters are used in commerce in which, differing from the illustration of the exemplary embodiments, the AND-gate is integrated, or in which the AND-function is contained. The multiplexer is a conventional component of a data selector.

An astable multivibrator (rectangular wave generator) converts in connection with the AND-gate the continuous signal which comes from the multiplexer into a single impulse which energizes the counter and permits it to continue to count for one single binary number (compare also what was said with respect to the binary counter). The decoder converts binary numbers into decimal numbers. (See for example TTL Integrated Circuits, Publisher: Texas Instruments Germany GmbH, 805 Freising. April 1971, in particular Pages 30, 31, 37, 39, 42.)

In order to eliminate interference impulses, the invention is advantageously further developed by providing that set inputs (E01 to E02) are connected to the binary counter (110). The intelligence signal must then continue for a predetermined time at the timing device which acts as a delay line, until it is recognized as such and reaches the input of the AND-gate. This development of the invention is for example of importance for tool machine controls.

In order to be able to adjust or "set" the binary counter at the start or during the sequence of operations to a selected number, the invention is further developed in that between the multiplexer 112 and the gate 115 there is inserted a timing device 113 having two AND-inputs of which the one input is energized by multiplexer 112A1 and the other input is energized by the set input 140 of the binary counter and by a signal line E00 for setting of the binary counter while the output of the timing device is connected to the input of the AND-gate. In order that during the program sequence "loops" can be driven or steps can be jumped, the invention is further developed by providing that at least one output of the sequence control system is connected with at least one set input of the binary counter and/or by providing further that at a connection of several set inputs to one output of the decoder 111 the conductors to the set inputs are coupled, for example by diodes 128 and 129. Further, if desired, the outputs of the decoder 111 may lead to a diode matrix 125. The arrangement of said specific features is dependent on the program sequence.

In the last-named embodiment, the outputs of the diode matrix can be connected both to the amplifier inputs for the final control elements (electromagnetic valve and others) and also to the set inputs of the binary counter.

Further advantages and characteristics of the invention can be taken from the following description.

BRIEF DESCRIPTION OF THE DRAWINGS

The invention is described in connection with exemplary embodiments which are illustrated in FIGS. 1 to 4.

DETAILED DESCRIPTION

Figure 1:
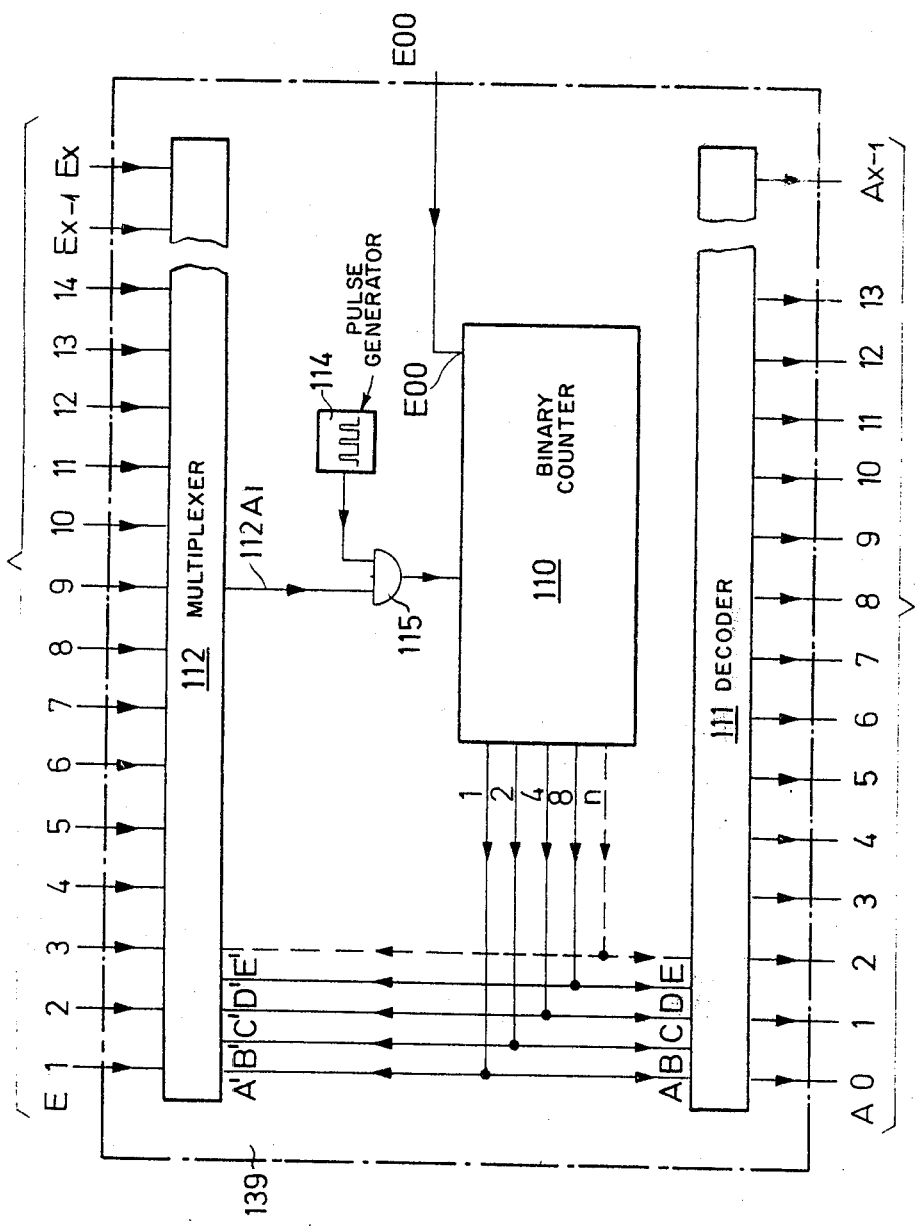
FIG. 1 is a block diagram of one exemplary embodiment of the invention.

FIG. 1 illustrates an exemplary embodiment of the invention of simple construction, which consists substantially of a binary counter 110, a decoder 111, a multiplexer 112, an astable multivibrator (rectangular wave generator) 114 and an AND-gate 115. The multiplexer 112 has inputs E1, E2 ... $E_{x-1}$, $E_x$, to which are connected, for example, limit switches of tool machines directly or for example through separating members, such as optoelectronic coupling elements. Such separating members, for example opto-electronic coupling elements (opto-isolators), are known from literature. (Brochure of Litronix Inc., 19000 Homestead Road, Cupertino, Cal. 95014, USA.)

The output 112A1 of the multiplexer is connected to an input of an AND-gate 115, to the other input of which a conventional rectangular wave generator 114 is connected.

The output of the AND-gate is connected to the input of the binary counter 110. The outputs of the binary counter lead on one side to the address inputs A', B', C', D', E' of the multiplexer 112 and on the other side to the data inputs A, B, C, D, E of the decoder. The operation of a binary counter is known. In the decoder 111, the binary signals are converted into decimal output signals A0 to $A_{x-1}$. At least one set input E00 is provided on the binary counter 110.

Upon the appearance of a supply voltage, the binary counter 110 is set on "0," namely adjusted automatically to "0" by a deionization impulse at the input E00. The binary "0" produces a signal at the output A0 while at the multiplexer 112 the input E1 is armed, namely is made ready for operation. If a signal is now applied at this input, a signal appears at the output 112A1 of the multiplexer, which signal acts on an input of the AND-gate 115. During the next impulse of the rectangular wave generator 114, the output signal of the multiplexer reaches the input of the binary counter 110 which switches to the binary "1," whereby the output A1 now sends out a signal and through the corresponding address input the input E2 is armed. With a different binary number at the input of the multiplexer the output signal at 112A1 disappears and the stepping advances one step. If a signal already exists at the input of the multiplexer, then same is immediately processed by the control system and it is advanced one step. If the corresponding signal is missing at the input of the multiplexer, then the input which has been armed remains in waiting position.

Figure 2:
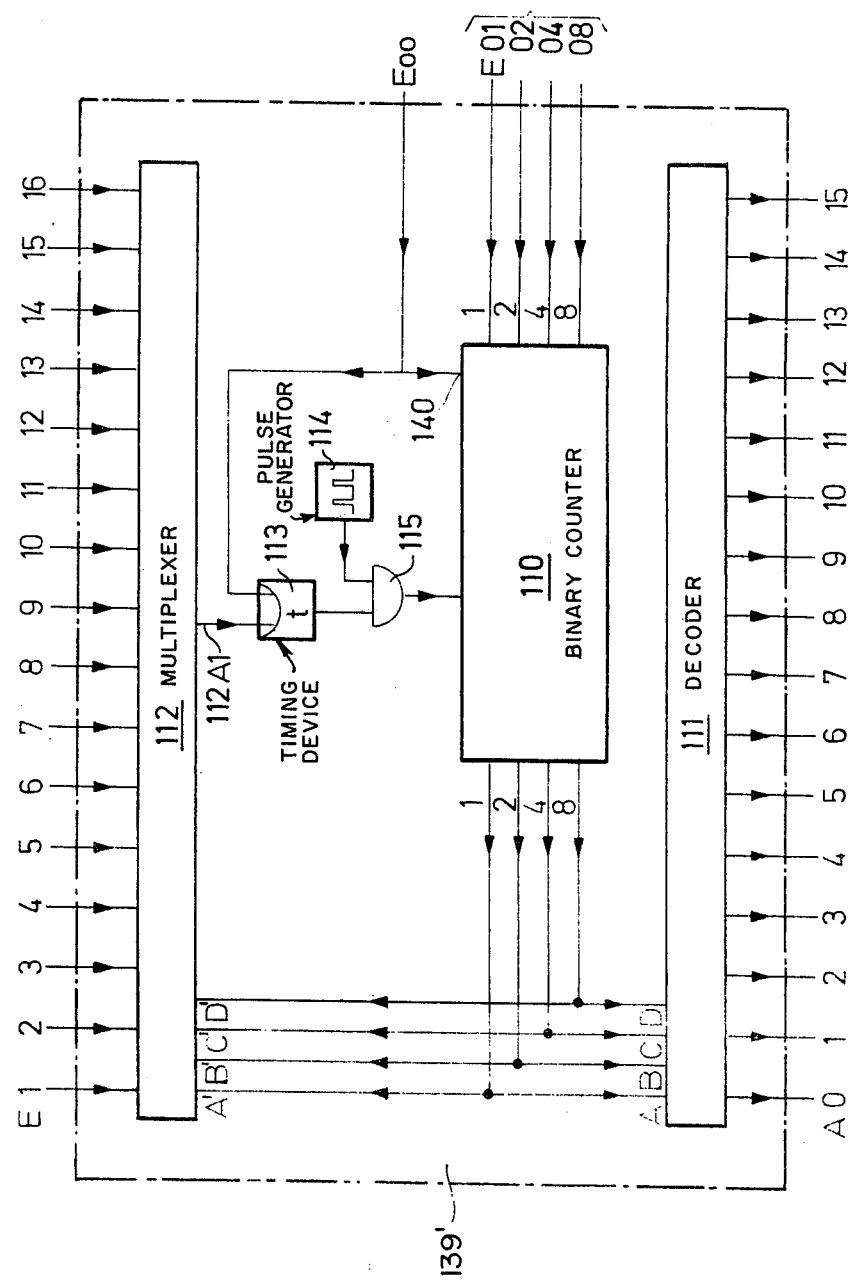
FIG. 2 illustrates an exemplary embodiment of the invention having set inputs on the binary counter and having timing means.

FIG. 2 shows a further exemplary embodiment of the invention, in which the control system is supplemented by a timing device 113 which acts as a delay line. The output 112A1 of the multiplexer is connected to an input of this timing device, the other input of which is at the input for the 0-setting. The output of the timing device is connected at an input of the AND-gate 115, the other input of which is, as before, connected to the pulse generator. The delay line (timing device 113) makes it also possible to use the control system where there is interference, as for example in tool machines. The intelligence signal must first appear for a predetermined time at the delay line until it is recognized as such and reaches the input of the AND-gate. The shorter interference pulses are in this way filtered out.

Furthermore, in this exemplary embodiment, set inputs E01 to E08 are provided with which any desired step can be activated. This renders it possible to jump steps in the program or to drive so-called loops, as will be explained more in detail hereinafter in connection with the example of FIGS. 3 and 4.

Figure 3:
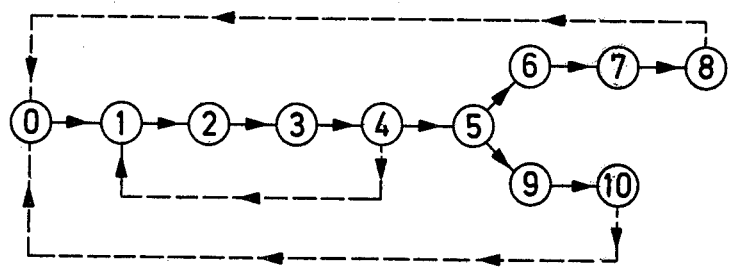
FIG. 3 schematically illustrates an example for a sequence of operations with a loop and with a "split path."

FIG. 3 schematically illustrates the sequence of a program in which at step 4 the apparatus switches back to step 1 in order to repeat the steps 1, 2, 3, 4. Thus, a so-called loop is driven. At step 5 the decision is made whether at a certain condition the program is continued either with the steps 6, 7, 8 or 9, 10. After the steps 8 or 10 the control system is set to "0" and the cycle can start over again.

Figure 4:
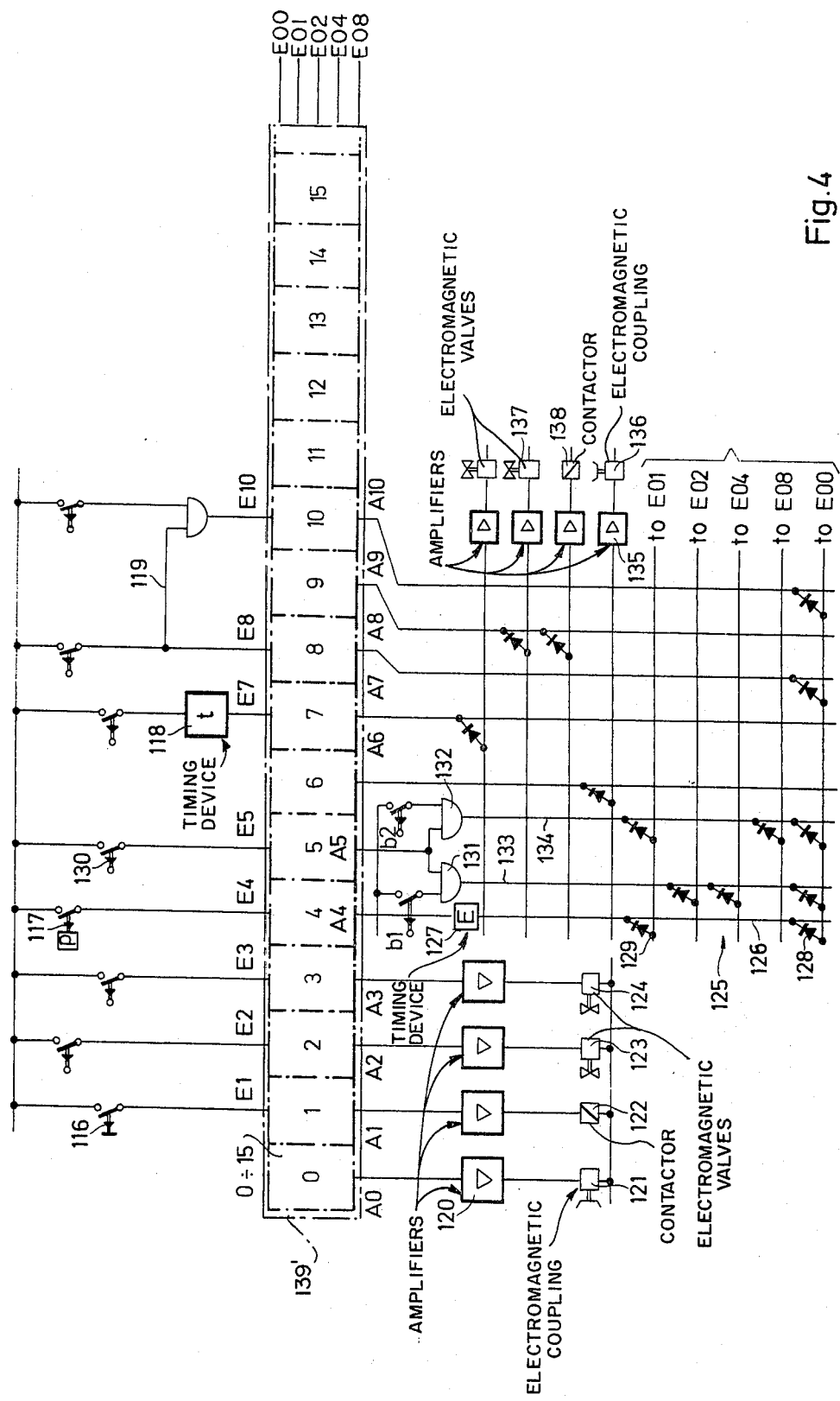
FIG. 4 illustrates an exemplary embodiment of the invention with a diode matrix which is designed corresponding to FIG. 3.

FIG. 4 illustrates the example for a control system for the program according to FIG. 3. The row of dash-dotted boxes represents a sequence control system according to the invention for 15 steps. Various switching elements are connected to the inputs of the multiplexer, thus at E1, E2 and E3 a limit switch 116, at E4 a pressure switch 117 and at E5 a limit switch 130. At E7, in addition to a limit switch, a timing device 118 is also provided. The connection at E8 has a branch 119 which leads to an AND-gate, the other input of which is energized through a further limit switch. The output of the AND-gate lies at E10. Various switching elements, for example an electromagnetic coupling 121, a d.c. current operated contactor 122, and each of electromagnetic valves 123, 124 are connected to the outputs A0 to A3 of the decoder through amplifiers 120. The outputs A4 to A10 lie on the vertical lines of a diode matrix 125. Output A4 is fed through a timing device 127 on a vertical line 126 which is connected through diodes 128, 129 to two horizontal lines, to each of which set inputs E00 and E01 are connected. As long as the limit switch 130 is not closed at the input A5, the control mechanism switches back in step 4 to the step 1. If the limit switch 130 is closed, the signal at A5 is faster than the time delayed signal at A4; the sequence thus continues.

In step 5 the decision is made which is dependent upon the condition of the switches $b1$ and $b2$, each lying at an input of an AND-gate 131, 132. The respective other inputs of these AND-gates are connected to the output A5. To the outputs of the AND-gates are connected the vertical lines 133, 134 of the matrix.

If the switch $b1$ is closed, then the binary counter is placed on the step 6 through the corresponding horizontal lines and the set inputs E02 plus E04. The signal which comes from A6 turns on an electromagnetic coupling 136 through the corresponding diode and the corresponding vertical lines and through an amplifier 135. The sequence then continues in a suitable manner through step 7 to step 8, where through the setting input E00 the sequence control system is set to "0," namely is switched back to the initial condition.

If the switch b2 is closed, then through the corresponding diodes and vertical lines the set inputs E01 plus E08 are energized, the control system switches on electromagnetic valve 137 and a contactor 138, starting from the output A 9 through the corresponding diodes and vertical lines and through amplifiers. In step 10, the sequence control system is returned again into the initial condition, starting from A10 through the set input E00.

The sequence control systems and the diode matrix are individually or in combination advantageously arranged in boxes 139 (FIG. 1) or 139' (FIGS. 2 and 4) or drawers or the like. The connection can then take place by simple multiple contact plugs. In this manner it is possible in a simple and clearly understandable manner to provide easily interchangeable and extensive sequence controls.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. An electronic sequence control system for controlling a given sequence of operation, comprising:
    a binary counter having a plurality of output terminals, an input terminal and setting input terminal;
    a decoder having a plurality of input terminals electrically connected to said output terminals of said binary counter and a plurality of output terminals, said plurality of output terminals being connected to selected components in said operation to effect the performance of a desired task in said sequence of operation;
    a multiplexer having a plurality of first input terminals electrically connected to said output terminals of said binary counter, a plurality of second input terminals having electrical signals applied thereto in response to functions performed during said desired task, and a single output terminal, selected ones of said first input terminals controlling selected ones of said second input terminals to control which signal is to appear at said single output terminal; and
    an AND-gate having two input terminals and a single output terminal, one of said input terminals to said AND-gate being electrically connected to said single output terminal of said multiplexer, the other input terminal being connected to a pulse generator so that said AND-gate will supply a signal to said output terminal thereof only when a signal is present on both of said input terminals thereof, said output terminal of said AND-gate being connected to said input terminal to said binary counter to effect an advancement of said binary counter to the next level.

2. A control system according to claim 1, wherein said pulse generator is a rectangular wave generator.

3. A control system according to claim 1, wherein between said multiplexer and said AND-gate there is a timing device having two AND-input terminals, one input being energized by signals appearing at said single output terminal of said multiplexer, the other input being connected to said setting input terminal and energized by a set input signal to said binary counter for setting of the binary counter to a desired level, the output of said timing device being connected to said one input of said AND-gate.

4. A control system according to claim 1, wherein set input signals are selectively supplied to said setting input terminal of said binary counter.

5. A control system according to claim 4, wherein at least one output signal indicative of the performance of said desired task is connected to said set input terminal of said binary counter.

6. A control system according to claim 5, wherein a plurality of set input terminals are provided to said binary counter and are electrically connected to at least one output terminal of said decoder, said electrical connection including a diode between each of said plurality of set input terminals and said output terminal of said decoder.

7. A control system according to claim 4, wherein said plurality of output terminals of said decoder are electrically connected to a diode matrix.

* * * * *